G. A. THODE.
PLOW.
APPLICATION FILED DEC. 9, 1910.

1,029,833.

Patented June 18, 1912.

WITNESSES:
M. M. Carlsen.
A. E. Carlsen.

INVENTOR:
Gustav A. Thode
BY his ATTORNEY:
A. M. Carlsen.

UNITED STATES PATENT OFFICE.

GUSTAV A. THODE, OF GROVER, COLORADO.

PLOW.

1,029,833.

Specification of Letters Patent.   Patented June 18, 1912.

Application filed December 9, 1910.   Serial No. 596,534.

*To all whom it may concern:*

Be it known that I, GUSTAV A. THODE, a citizen of the United States, residing at Grover, in the county of Weld and State of Colorado, have invented a new and useful Plow, of which the following is a specification.

My invention relates to plows of the kind sometimes called disk plows and sometimes rotary plows.

My plow is especially designed for deep plowing; and the objects are, to provide such plow with means for steering it properly, means for plowing one or two furrows at a time, and means for increasing the depth and width of the furrow plowed.

Figure 1:
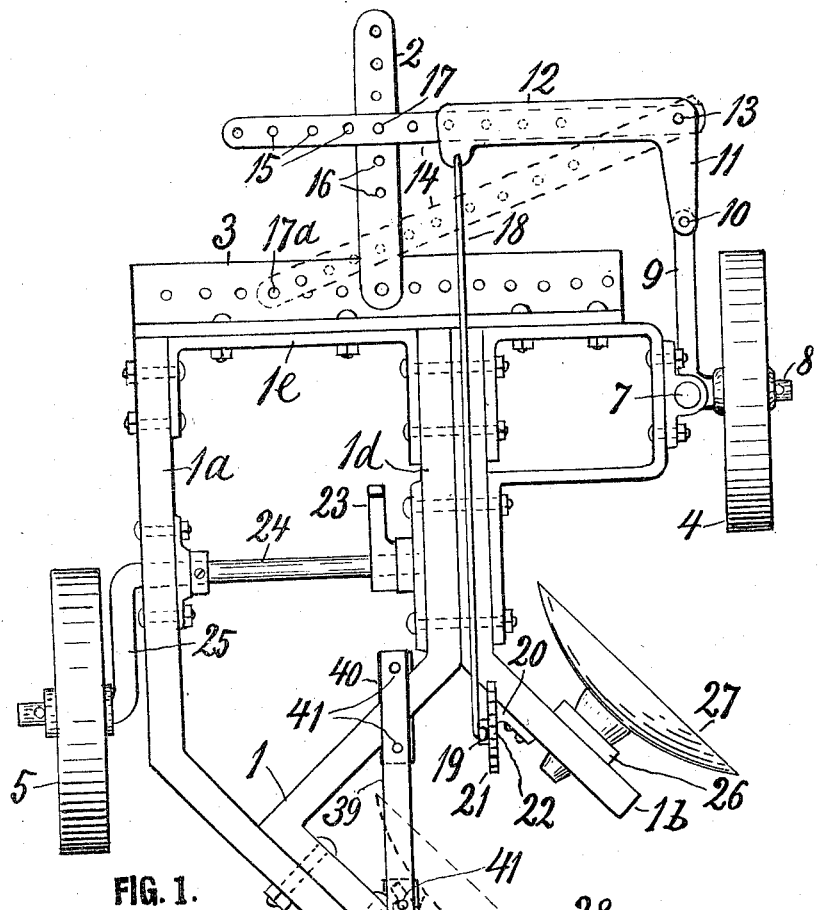
Figures 2, 3:
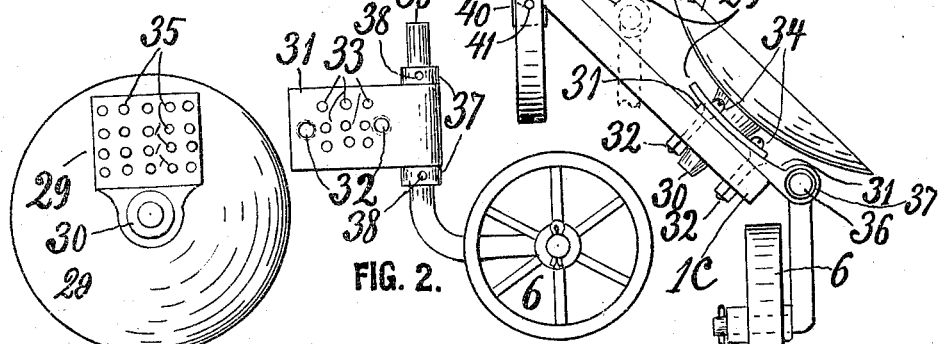

In the accompanying drawing, Figure 1 is a top or plan view of a plow embodying my invention. Fig. 2 is a side elevation of the rear caster and the bracket holding it. Fig. 3 is a side elevation of the rear disk and its journal and supporting plate thereof removed from the bracket shown in Fig. 2.

Referring to the drawing by reference numerals, 1, 1ª, 1ᵇ, 1ᶜ, 1ᵈ, and 1ᵉ designate the frame of the plow or plowing machine, as it may also be termed.

2 is the draft clevis of same and is attached to a perforated flat transverse bar 3, secured at the front end of the frame.

4, 5 and 6 are the supporting wheels of the frame. These wheels, and the usual lever mechanism (not shown) by which they are inclined, or the frame raised and lowered, are so well known that I need not here show or further describe the same. Only this may be said in regard to the front wheel 4, that the stem 7 of the short axle 8 is provided with a horizontal forward arm 9, which is pivotally connected at 10 with the rearward arm 11 of a bell-crank lever 11—12, which is fulcrumed at 13 upon the outer end of a link-bar 14; the latter is provided with a series of holes 15, either of which may be brought directly over one of the holes 16 in the draft clevis 2 and a pin 17 dropped into the registering holes, and as the link-bar and the bell-crank lever may thereby be held more or less toward the right or left side of the plow, the arm 9 is thereby caused to hold the wheel 4 in any required direction for steering the plow. Said connection with the draft clevis will also cause the wheel 4 to retain its position relative to the direction in which the draft animals, or other power, pull at the clevis 2.

To enable the driver to change the direction of the wheel 4, temporarily or otherwise, while the machine is in motion, the arm 12 of the bell-crank lever is by a rod 18 connected with an upright hand-lever 19, which is fulcrumed on a bracket 20, that is secured on the frame and has a toothed sector 21 engaged by a dog 22, the latter being carried by the lever.

When the ground operated on and other conditions remain unchanged for a considerable length of time, the link-bar 14 may have its inner end removed from the clevis and secured upon the transverse bar 3 by placing the pin 17 as 17ª in Fig. 1.

23 is a rocker arm fixed on the shaft 24 and connected with an operating lever (not shown) which causes said shaft to turn and by its crank-shaped portion 25 raise and lower the frame. Other means for the same purpose is not shown, as already before stated.

On the arm 1ᵇ of the frame is mounted by a bracket 26 a rotatable disk 27; and in direct line rearward therefrom is mounted on the frame arm 1ᶜ a similar disk 28. The mounting of the latter disk involves a curved or segmental perforated plate 29, on which the journal bearing 30 of the disk is formed; and a similarly curved bracket plate 31, which is secured to the frame by bolts 32 and is provided with several, preferably tapped, holes 33 for the reception of either bolts or screws 34, which are passed into said plate through two or more of the holes 35 in the plate 29 (see Figs. 2 and 3); the holes selected depending on the depth and width it is desired to have the disk operate in the soil; the vertical position or height of the plate controlling the depth, and the rearward moving of the plate enlarging the width of the furrow by giving the disk a more transverse position, owing to the segmentally curved form of both plates, as shown by curved lines in Fig. 1. In the bracket 31 is also journaled the stem 36 of the caster 6; said stem may have collars 37 with set-screws 38 to make the stem adjustable up and down in the bracket, or means (not shown) may be provided for raising and lowering the frame on the stem by a lever and toothed sector of the well known types used in similar machines.

39 designates the beam of a common mold-board plow, which it is unnecessary to show in detail; said beam is secured upon the rear portion of the frame by bolts 41 passed through the beam and through clamps 40 taking underneath the frame, said clamps and bolts making the mold-board plow detachable whenever it is not wanted. The plow beam may of course be made longer than shown, especially where it is intended to let the mold-board plow work at any considerable depth.

The longitudinal bar $1^a$ of the frame is extended all the way from the left front corner of the frame to the arm $1-1^c$ of the frame, as a brace, to stiffen the latter, so that it may not need to be extra heavy although it is long and exposed to much strain from the rear disk, or said disk and the mold-board plow.

In the operation of the plow, the plowing is usually performed by two disks, 27 and 28, which are mounted to rotate on the frame one in rear of the other, the rear one at a greater depth than the front one, so as to deepen the furrow made by the front disk; this being desirable where the land is much worn out, or in the so-called dry farming, where extra depth is necessary to reach fresh soil, or moisture, as the case may be. And by setting the rear disk at an extra obtuse angle to a straight forward line, the furrow will also be wider and thus made easier for the right side horse that has to travel in it during the plowing of the next furrow in the same manner. While such plowing is going on the mold-board plow will make a shallow furrow for the disks to follow during the next operation, such shallow furrow enabling the disks to work deeper than if no mold-board plow was used. In plowing ordinary land the rear disk 28 may be either removed or moved to the position shown in dotted lines, by moving the bracket plate 31 and its bolts 32 and rear caster with it. When the rear disk is in said forward position, the mold-board plow is removed from the frame and the two disks are plowing in one operation two complete furrows of common depth; or, if a little extra depth is desired the rear disk may be regulated to make a shallow furrow which the front disk will deepen and widen during the next operation, while the rear disk makes another shallow furrow.

It is obvious that the various operations and regulations of the disks, as just described, will vary the tendency to turn the frame to one side or the other, and as such tendency is counteracted by the position of the furrow wheel 4, the special steering means involving the hand-lever 19 and its connection with the steering wheel enter into combination with the variableness of the disks or plowing means, to enable the latter to work properly in their various positions.

What I claim is:

1. In a disk plow, the combination with a frame and wheels supporting it, of two disks mounted one directly rearward of the other on the frame, said rear disk being movable on the frame from a position directly rearward of the front disk, to a position in which it may make a second furrow; said rear disk being also adjustable vertically on the frame, for the purposes set forth.

2. In a disk plow, the combination with a frame and wheels supporting it, of two disks mounted on the frame one directly rearward of the other, said rear disk being adjustable vertically and to different oblique directions on the frame and movable from a position directly rearward of the front disk to a position in which it makes a second furrow.

3. In a disk plow, the combination with a frame and wheels supporting it, of two disks mounted on the frame one rearward of the other, said rear disk being adjustable as to its oblique position on the frame and also adjustable vertically on the frame and movable from directly rearward of the front disk to a position for making a second furrow; the mounting of said rear disk involving a horizontally curved plate forming a movable bracket on the frame, a similarly curved journal plate adjustably secured to the bracket plate and carrying the journal of the disk, and a vertically disposed journal bearing on the bracket plate, and a caster having its stem journaled in said bearing and arranged to support the frame.

4. In a disk-plow, the combination with a frame and wheels supporting it, of two disks mounted on the frame one rearward of the other, said rear disk being adjustable vertically and to different oblique directions on the frame, and movable from a position directly rearward of the front disk to a position in which it may make a second furrow, a mold-board plow detachably secured to the frame in a position to make a second and shallow furrow when the rear disk is directly rearward of the front disk, whereby the two disks are able to make an extra deep furrow while the mold-board plow makes a shallow furrow preparatory to operation by the disks.

In testimony whereof I affix my signature, in presence of two witnesses.

GUSTAV A. THODE.

Witnesses:
 E. G. EDWARDS,
 JOHN W. CLARK.